(12) United States Patent
Ratzlaff et al.

(10) Patent No.: US 7,502,017 B1
(45) Date of Patent: Mar. 10, 2009

(54) HANDWRITING RECOGNIZER USER INTERFACE METHODS

(75) Inventors: Eugene Henry Ratzlaff, Hopewell Junction, NY (US); Yin-Min Chee, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/943,260

(22) Filed: Nov. 20, 2007

(51) Int. Cl.
*G06F 3/041* (2006.01)
(52) U.S. Cl. ................................ 345/173; 715/700
(58) Field of Classification Search ............ 345/173, 345/179
See application file for complete search history.

(56) References Cited

U.S. PATENT DOCUMENTS

| | | |
|---|---|---|
| 3,487,371 A | 12/1969 | Frank |
| 4,262,281 A | 4/1981 | Buckle et al. |
| 5,455,901 A | 10/1995 | Friend et al. |
| 5,546,538 A | 8/1996 | Cobbley et al. |
| 5,682,439 A | 10/1997 | Beernink et al. |
| 5,717,939 A | 2/1998 | Bricklin et al. |
| 5,732,152 A | 3/1998 | Sakai et al. |
| 5,862,256 A | 1/1999 | Zetts et al. |
| 5,903,666 A | 5/1999 | Guzik et al. |
| 6,002,799 A * | 12/1999 | Sklarew ............ 382/189 |
| 6,005,973 A | 12/1999 | Seybold et al. |
| 6,167,411 A | 12/2000 | Narayanaswamy |
| 6,661,409 B2 | 12/2003 | Demartines et al. |
| 7,062,089 B2 | 6/2006 | Akiyama |
| 7,137,076 B2 | 11/2006 | Iwema et al. |
| 2004/0161151 A1 | 8/2004 | Iwayama et al. |
| 2005/0152602 A1 | 7/2005 | Chen et al. |
| 2005/0175242 A1 | 8/2005 | Tanaka |
| 2006/0033719 A1 | 2/2006 | Leung et al. |
| 2007/0154093 A1 | 7/2007 | Dunton et al. |

FOREIGN PATENT DOCUMENTS

JP 59-163685 9/1984

OTHER PUBLICATIONS http://www.penandinternet.com/piweb/news/pressroom/Imagesfs.asp , "Pen&Internet's Next-Generation Handwriting Recogniation Solutions Enhance Productivity of New Computing Paradigm".

(Continued)

*Primary Examiner*—Sumati Lefkowitz
*Assistant Examiner*—Ke Xiao
(74) *Attorney, Agent, or Firm*—Scully, Scott, Murphy & Presser, P.C.; Daniel P. Morris., Esq.

(57) ABSTRACT

A handwriting recognition device including a handwriting recognizing component such as a software application running on a microprocessor. A user interface includes a display having a stroke entry field for digitizing and displaying the strokes comprising one or more written characters, and also incorporates a character spacing indicator to indicate a new character entry field with an adjacent new word indicator to indicate a new word entry field. A recognized character display area is on the display substantially adjacent to the stroke entry and display field. The handwriting recognition component includes an output recognition buffer (ORB) for holding and correcting characters while the characters are being displayed in the recognized character display area.

2 Claims, 3 Drawing Sheets

OTHER PUBLICATIONS

Kai-Tai Tang, et al., "Teaching Chinese Handwriting by Automatic Feedback and Analysis for Incorrect Stroke Sequence and Stroke Production Errors", Learning by Effective Utilization of Technologies: Facilitating Intercultural Understanding, R. Mizoguchi et al. (Eds.), IOS Press, 2006; Department of Computer Science, City University of Hong Kong, Hong Kong SAR, pp. 107-114.

John F. Pitrelli, et al., "Creating word-level language models for large-vocabulary handwriting recognition", International Journal on Document Analysis and Recognition (revised version: Jul. 22, 2002), 5:pp. 126-137.

U.-V. Marti, et al., "Text Line Segmentation and Word Recognition in a System for General Writer Independent Handwriting Recognition", Institu für Informatik und angewandte Mathematick Universität Bern, Neubrükstrasse 10, CH-3012 Bern, Switzerland, pp. 159-163.

Wolfgang Hürst, et al., "Error Repair in Human Handwriting—An Intelligent User Interface for Automatic On-Line Handwriting Recognition", Interactive System Laboratories, Carnegie Mellon University, Pittsburgh, PA, U.S.A.; University of Karlsruhe, Germany.

Xugang Wang, et al., "Multimodal Error Correction for Continuous Handwriting Recognition in Pen-based User Interfaces", IUI'06, Jan. 29-Feb. 1, 2006, Syndney, Australia, pp. 324-326.

John F. Pitrelli, et al., "Confidence modeling for handwriting recognition: algorithms and applications", International Journal of Document Analysis (2006) 8(1): 35-36, pp. 35-46.

* cited by examiner

HANDWRITING RECOGNIZER USER INTERFACE METHODS

FIELD OF THE INVENTION

The present invention relates to a handwriting recognition device and, more specifically, relates to a handwriting recognition device including a user interface and display area.

BACKGROUND OF THE INVENTION

Handwriting recognition user interfaces (HWRUIs) for computing devices, e.g., personal digital assistants (PDAs) or handheld computers, allow the user to enter handwritten strokes, for example, via a handwriting stylus or pen, and then facilitate correction of recognition errors. HWRUIs typically transfer recognized characters directly to the user application (for example email or SMS) as would happen with a keyboard interface. Typical HWRUI systems try to optimize certain aspects of this interaction, but for many systems the engineering emphasis has been on recognition accuracy and not on the entire user experience.

One problem with known HWRUIs is that users cannot easily review and confirm that their output is correct, and cannot easily correct errors when they occur. Typically, the output appears in an application window that is far from the writing area, so that the user must divert his attention back and forth between the writing area and the distant application window. In order to make a correction, several steps are typically required. First, the user must move the stylus from the writing area to the application window and then select the character or word that contains the error. Unfortunately, proportional fonts often make the process of selecting a narrow character difficult. Then the user must re-write the character in order to replace the error with a correct result, which is cumbersome and time consuming. Further, the user must wait for the recognizer to return the corrected result to check if the result is in fact correct, and if not, repeat the process.

Typical handwriting recognition systems do not allow users to correct errors as they happen or "on the fly". Correcting errors as they happen is natural for many users especially users who work with current word processing programs that allow easy correction when typing using a keyboard. The user can see the output in real time, and correct the output immediately. The user can either confirm the accuracy of the output by seeing the keys they strike, or the user may be a touch typist who is able to watch the output at the same time she enters the input. By contrast, as few writers write legibly and therefore need to watch the recognized text to check and correct their input, it is inconvenient to have the output appear both distant from the writing area and in a continuously changing location. Current HWRUIs do nothing to ameliorate this problem.

Another problem with known HWRUIs is that writers must either enter each character (or word) into a separate box or must create distinctly wide spaces between characters and words to ensure that the recognizer correctly segments these character or word units. If a separate box is used, the user typically must move back and forth between different boxes in order to write. If a single box is used, the user must write sequential characters in the same location. When a single box is used the user must wait for the system to process and clear the writing before entering new text. Further drawbacks of current systems include problems related to putting spaces between characters or words. Writing with natural spacing often results in merge errors, e.g., the recognizer merges characters together. Further, exaggerating spacing to compensate for merge errors results in an unnatural and uncomfortably wide spacing style that also wastes space, bringing the writer to the end of the writing space prematurely. As a result of entering fewer characters on a single line, the efficiency of the recognition system is reduced since a new line must be started more frequently. Starting new lines not only means additional stylus relocation, but also generally results in disrupting the user's writing.

Therefore, a need exists for a handwriting recognizing system and interface which allows a user to readily view the recognized entered text and make corrections with minimum strokes and shifting of a stylus. It would also be desirable to provide a system and interface, which improves the ease of character and word spacing while minimizing the space used.

SUMMARY OF THE INVENTION

In an aspect of the invention, a handwriting recognition device includes a handwriting recognizing component, and a user interface including a display. The handwriting recognition device further includes a stroke entry field for entering strokes forming written characters in a current character field of the stroke entry field which form a current character stroke set. The current character stroke set is written by multiple strokes, and the handwriting recognizing component interprets the multiple strokes as comprising a single character. A new character field adjacent to the current character field indicates a position in the stroke entry field for entering a next character. A new word entry field adjacent to the stroke entry field is for entering strokes for a new word. A recognized character display area on the display substantially adjacent to the stroke entry field displays at least one recognized character by the handwriting recognizing component. The recognized character and the locations of the new character and new word entry fields are changed in response to adding strokes to the current character stroke set, and the handwriting recognizing component includes an output recognition buffer (ORB) for holding the at least one character in the buffer while the at least one character is being displayed in the recognized character display area.

In another aspect of the invention, a method for recognizing handwriting includes: writing characters using multiple strokes in a stroke entry field on a display of a user interface; displaying the digitalized strokes in a current character field of the stroke entry field; interpreting the multiple strokes as comprising a single character; recognizing the written characters; displaying recognized characters substantially adjacent to the current character field of the stroke entry field; changing the recognized characters in response to changing the strokes in the stroke entry field; displaying a new character field adjacent to the current character field indicating a position in the stroke entry field for entering a next character; and displaying a new word entry field adjacent to the stroke entry field for entering strokes for a new word.

BRIEF DESCRIPTION OF THE DRAWINGS

These and other objects, features and advantages of the present invention will become apparent from the following detailed description of illustrative embodiments thereof which is to be read in connection with the accompanying drawings, in which.

DETAILED DESCRIPTION OF THE INVENTION

Figure 1:
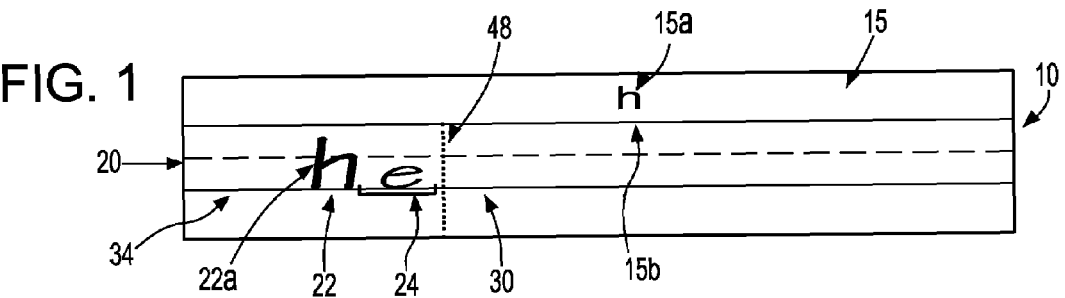
FIG. 1 is a plan view of a user interface according to an embodiment of the invention depicting a displayed current character stroke, a displayed active stroke for a new character in the new character field above a character spacing indicator, and a recognized character in a character recognition area.

An exemplary embodiment of a handwriting recognizer user interface 10 according to the present invention is shown in FIG. 1. The user interface 10 includes an Output Recognition Buffer (ORB) display 15, a stroke entry and display field 20, a new character entry field bracket 24 for indicating character spacing using the bracket 24, and a new word field 30 separated by a word spacing indicator 48. The stroke entry and display field 20 further includes a current character stroke set 22a in a current character field 22 at the baseline 34. The ORB display 15 includes a recognized current character display location 15b containing the current recognized character "h" 15a. A stroke is defined herein as the act of writing with a stylus, which can be digitally represented in the display 15.

Referring to FIG. 1, the current character stroke set 22a is displayed in the stroke entry and display field 20. The ORB display 15 is generated from computer memory configured as an Output Recognition Buffer (ORB) 86 located in a handwriting recognition device 78, shown in FIG. 4, to display recent recognition results in the ORB display 15, an "h" 15a in the case of FIG. 1. The device 78 further includes a handwriting recognition component or engine 72 embodied, for example, as software or handwriting recognition application running on a microprocessor 82 for recognizing a new character written by the user.

Figure 2:
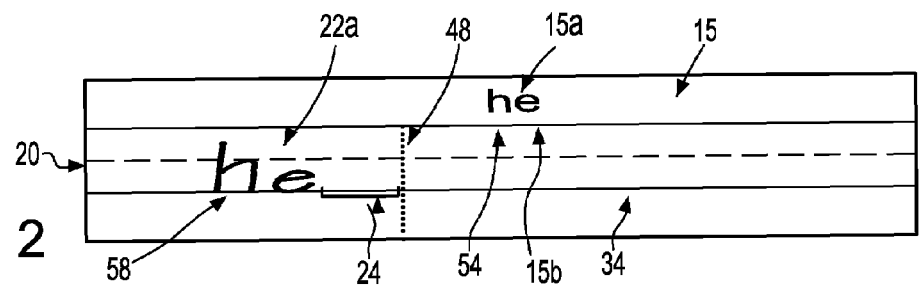
FIG. 2 is a plan view of the user interface shown in FIG. 1, depicting the character spacing indicator ready for a new character stroke, the preceding recognized character shifted in position, i.e., to the left, and a new recognized character shown in the recognized character display field.
Figure 4:
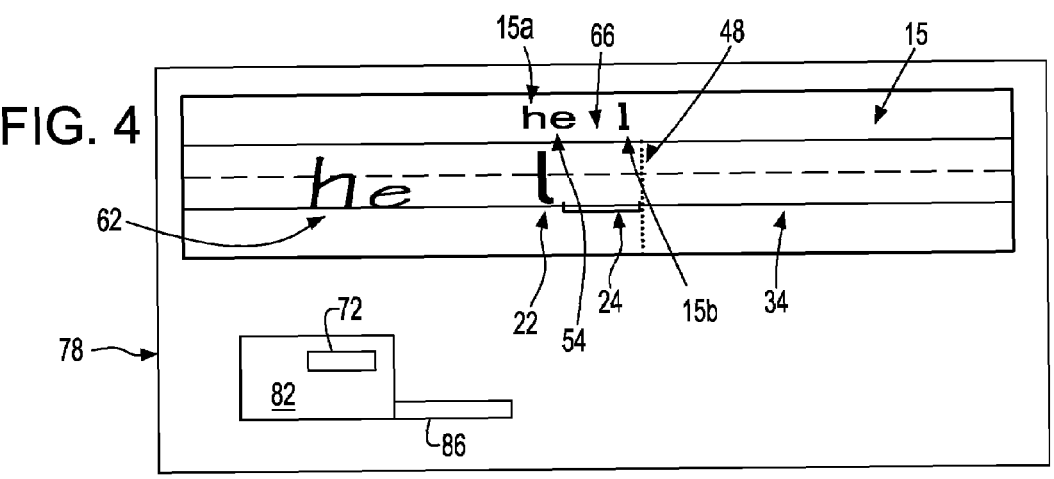
FIG. 4 is a plan view of the user interface shown in FIG. 3 as part of a handwriting recognizing device including a handwriting recognizing component, and the user interface depicts the character spacing indicator to the right of the displayed current character stroke.

Referring to FIG. 2, the newly entered stroke set for the character "e" is recognized by the handwriting recognition application and the resulting recognized character "e" becomes the new current character 15b. The previously recognized "h" 15a is shifted in position in the ORB display to the left of the current recognized character position 15b. The newly entered stroke "e" is displayed as the current character stroke set 22a in the stroke entry and display field 20. Referring to FIG. 4, the ORB display 15 temporarily displays recent recognition results received from the microprocessor 82 in the handwriting recognition device 78 after performing handwriting recognition using the handwriting recognition component or engine 72.

The ORB display 15 reflects the contents of the ORB 86. The buffer 86 may also include additional information, such as, the temporal order in which the characters were generated, the alternates list for each character, the alternates list for each word, and a record of the original strokes that resulted in the character/word.

Figure 7:
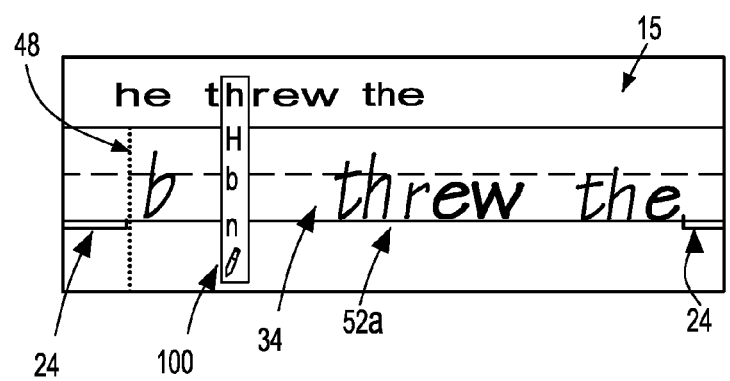
FIG. 7 is a plan view of the user interface shown in FIG. 6 depicting alternative characters.

When edits are made in the ORB display 15 using a menu 1000, as shown in FIG. 7, the ORB 86 is affected through the user's actions. The changes are immediately reflected in the receiving application by sending sufficient delete character commands to the application, then resending the changes and all subsequent characters back to the application, so that the ORB display 15 displays the corrected word.

The ORB display 15 facilitates the display and correction of characters and words. The ORB display 15, in one embodiment depicted, is a single-line text display window and appears adjacent to the stroke entry and display field 20, which location is convenient for reviewing and correcting results as they are written. The ORB display 15 renders the text right-justified (or left-justified for right-to-left languages such as Arabic) using a constant-width font in an exemplary embodiment. Right justification means that as each character is sent to the ORB display 15 subsequent to recognition, the most-recently added character appears in the rightmost display location of the window, and any and all of the antecedent characters are moved one character position to the left. By this means, the user has a single point of focus in the ORB display 15 for new characters. This point of focus is also close to where the user is looking, because the text is right-justified and the ORB display 15 is near the writing fields. This is in contrast to left-justified display outputs, where the user's point of focus must move as characters are sequentially entered and added to the text output being generated by the user. As a result of the point-of-focus being close to the stroke entry field 20 and being stationary, the writer who frequently views and confirms the output while writing can write more quickly without the need to seek a distant, moving target.

Figure 8:
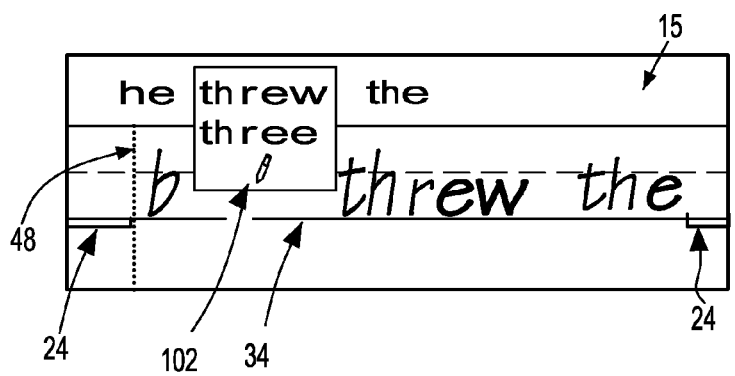
FIG. 8 is a plan view of the user interface shown in FIG. 7 depicting an alternative word.

Referring to FIGS. 7 and 8, the ORB 86 also improves efficiency by retaining alternate recognition transcriptions off display and making them readily available for corrections. Alternate transcriptions are the several "next-best" recognition estimates available from the recognition engine 72. The recognition engine 72 transcribes a character into not just one answer, but a list of alternate characters 100 ordered by their estimated correctness, as shown in FIG. 7. For example, a single large circle might return the resulting ordered alternates list: (O 0 6 o c). The ORB display 15 displays the best result (O in the example) and will also retain (off display) all the alternates in order to make them available to the user to select for correction. To make a correction the user taps or selects, e.g., with a handwriting stylus, the incorrect character, or word, and a pop-up menu appears above or below the incorrect value listing all of the recognition alternates. As shown in FIGS. 7 and 8, an alternate character list 100 displays alternate characters, and an alternate word list 102, respectively, displays alternate words as initiated by the user by tapping or selecting the character or word, To select a correct word or character, the user simply taps the correct selection, the pop-up disappears, and the correct result replaces the incorrect character or word in the ORB display 15 and the correction is made in the application as previously described.

It is an advantage of the ORB display 15 interface method to provide both character and word alternatives. In an example of word correction by revising only selected characters, the word "CODE" (a hexadecimal number) is written, where the second character is a zero. The recognizer misinterprets the first two digits and consequently the displayed result is "6ODE", where the second character is the letter "O". Using the ORB display 15 with both character and word alternates the user could find character corrections for both the erroneous "6" and the "O" and complete the correction in only four taps. Note that if the ORB display 15 interface method had instead been constrained to offer only whole world alternatives the user would have been required to rewrite the entire word in order to correct it. Alternatively, if the desired outcome was the English word "code" the user could instead choose to view full word alternates, where it is likely that the list would include "CODE" and "code". It is understood that, in some embodiments, correct results for English and non-English characters or words may be displayed if the handwriting recognition software is so programmed.

Another advantage of the ORB 86 is that it allows simple access to alternates-list corrections on the ORB display 15 without the need to correct each character or word immediately after it is entered. This also obviates the need for the software developer of the user application to provide special software interfaces between the user application and the recognizer in order to allow the user to make changes to the user's content in the user application. Further, allowing one or more characters to be written before corrections are made allows the user to focus on writing an entire phrase without interruption. Resultantly, the user can more quickly enter text and data because the corrections can be done after a word or phrase is written by using the ORB display 15. The ORB 86 allows corrections to be performed using the ORB display 15 so that all entries in the buffer can be changed.

The handwriting recognizer device 78 can also be programmed to use the original misrecognized stroke data to retrain the recognizer to more accurately return the correct result. The user can instruct the device 78 to retain written strokes with associated user-initiated corrections either manually or automatically. This retained information can then subsequently be used to retrain the recognizer for improved recognition accuracy.

In another embodiment according to the present invention, a pop-up virtual keyboard is programmed into the device 78 to allow the user to immediately key in the selected character (or word) for correction. Further, the device 78 can support different user selectable methods of displaying character or word alternates. For example, presenting alternate characters in a pop-up virtual keyboard with the likely alternates highlighted or enlarged.

In another embodiment, an enhanced display of the character(s) displayed in the ORB display 15 provides a clear, visual feedback for selecting the desired character for correction. The character and their neighbors may be expanded or magnified when touched by a stylus. This would, for example, be helpful for properly selecting for correction narrow characters such as "i" or "l" amidst other characters. Expansion or magnification would allow the user to subsequently move the stylus over the desired character within the magnifier and then lift the stylus to initiate the pop-up alternates menu.

In another embodiment of the invention, the device 78 can be programmed to support right-to-left languages such as Arabic.

Further, in another embodiment, special spacing indicator symbols could be inserted between the buffered text characters in the ORB display 15. The special spacing indicator symbols may be displayed approximately above or below the text line, for example, and have a special color or appearance otherwise distinct from the recognized characters, and allow sufficient space between characters to permit easy selection.

The user interface 10 uses a variable spacing (VariS, pronounced "varies") entry method that continuously monitors stroke entry and dynamically adjusts the location of the new character field spacing indicator 24 and new word spacing indicator 48. These indicators show the writer the areas where strokes may begin or should not cross in order to avoid or alternatively create valid character and/or word separation. By dynamically adjusting the location and/or appearance of such indicators the HWRUI more efficiently uses the available space, since the alternative is to implicitly require that the user be overly conservative in generating wide spaces between characters or words in order to maintain optimal recognition accuracy. VariS allows the user to write more quickly while simultaneously helping improve recognition accuracy. Indicators other than the new character field spacer 24 and the new word spacing indicator 48 can be used to provide useful indications to the user, such as, different colors or sizes of words or characters.

VariS works in conjunction with the recognizer and ORB 86 and ORB display 15 to allow for continuous recognition of characters. After the first stroke of a character is completed (with stylus subsequently raised), all characters in the ORB display 15 are shifted to the left and the recognized result corresponding to the aforementioned stroke is presented at the (right-justified) end of the ORB display 15. Each time an additional stroke is added in the area overlying the original stroke in the process of completing the written character, the device 78 replaces the last character with a new recognized output in the ORB display 15. The advantage of continuous recognition is that it allows a writer to instantly confirm the recognition result after the writer has finished writing a character without having to wait the conventional timeout period. This is more comfortable, less distracting and allows faster input because less time is consumed waiting for recognition to complete before the user can confirm that a result is correct.

Referring to FIG. 7, when the user reaches the (right-hand) end of the baseline 34, the new character entry field bracket 24 "wraps" to the (left-hand) beginning of the baseline 34 to allow the user to continue text entry at the beginning of the baseline. The new word spacing indicator 48, also wraps, giving the user the ability to either continue the current word or begin a new word when writing at the beginning of the baseline.

Figure 3:
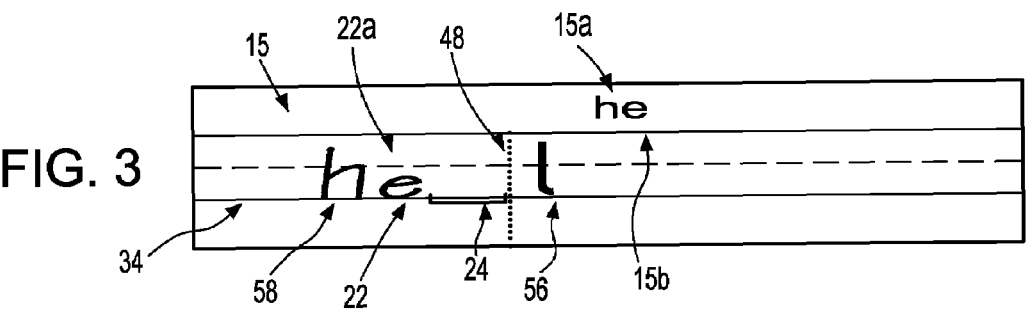
FIG. 3 is plan view of the user interface shown in FIGS. 1 and 2, depicting a displayed active stroke for a new first character of a new word.
Figure 6:
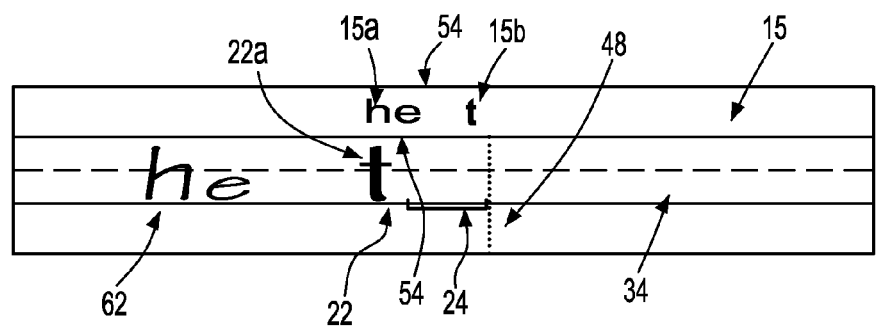
FIG. 6 is a plan view of the user interface shown in FIG. 5 depicting the modified character strokes and the resultant recognized character in the character recognition area.

In use, the user writes in the stroke entry field 20 at the new character entry field bracket 24. When the user lifts the stylus, the appearance of the written stroke is changed to indicate the current character set segmentation. Character segmentation refers to how strokes are "grouped" to be members of different character stroke sets. In this case, those strokes that are part of the current character are distinguished from those that are considered part of previous characters. Each grouped stroke set is separately recognized as a single character. At the same time, the stroke entry and display field 20 displays the character and the new character entry field bracket 24, and the new word spacing indicator 48, respectively, based on, for example, the rightmost coordinate of the last stroke, as shown in FIGS. 1 and 6. The ORB display 15 is also updated with the recognition result for the current character stroke set 22a, as shown in FIG. 3. Referring to FIG. 1, a new character "e" is written by a user using the new character entry field bracket 24 as a guide for placement of the next stroke. By locating the new stroke within the boundaries indicated by the spacing indicator the user has elected to append (without an intervening space) a new character "e" to the current word thereby generating "he" in the ORB display. In another example, referring to FIG. 3, a new stroke 56 is written by the user to the right of the word spacing indicator, thereby using the new word spacing indicator 48 to generate the first character of a new word. The effect is seen in FIG. 4 wherein a space 66 is generated automatically by the device 78, and the new character entry field bracket 24 is moved to indicate the next character location.

Figure 5:
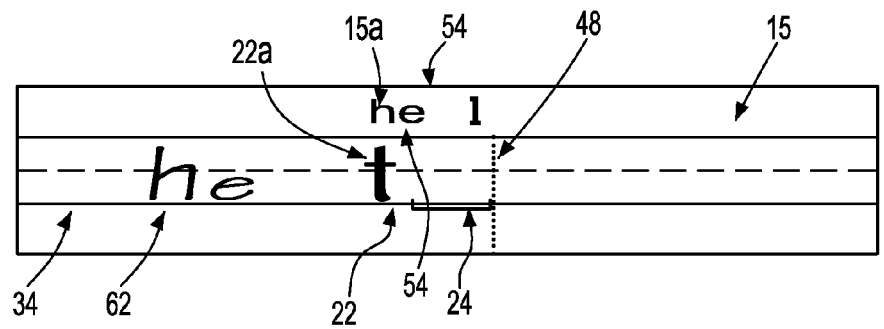
FIG. 5 is a plan view of the user interface shown in FIG. 4 depicting the current character stroke set being modified by the addition of a new active stroke to the left of the character spacing indicator.
Figure 9:
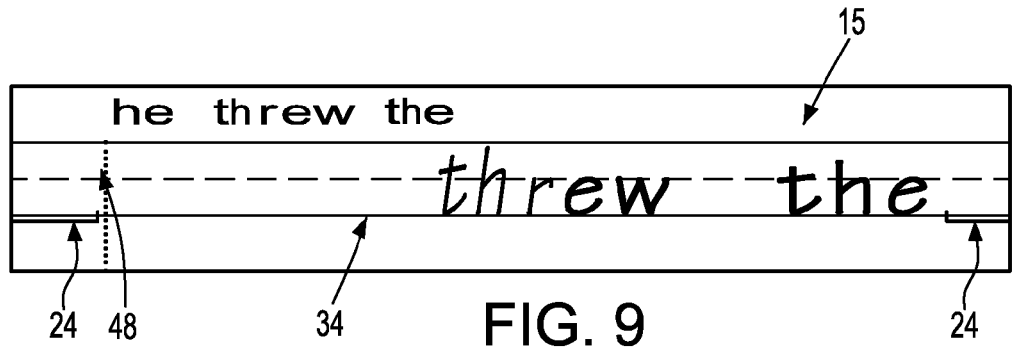
FIG. 9 is a plan view of the user interface shown in FIG. 8 depicting the character spacing indicator wrapping around to the beginning of the character entry field.
Figure 10:
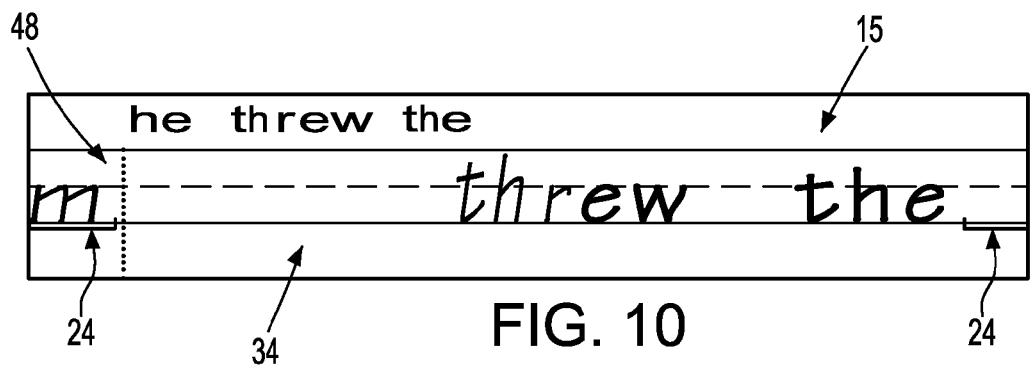
FIG. 10 is a plan view of the user interface shown in FIG. 9 depicting the display of a new active stroke entry in the new character field above the wrapped character spacing indicator.
Figure 11:
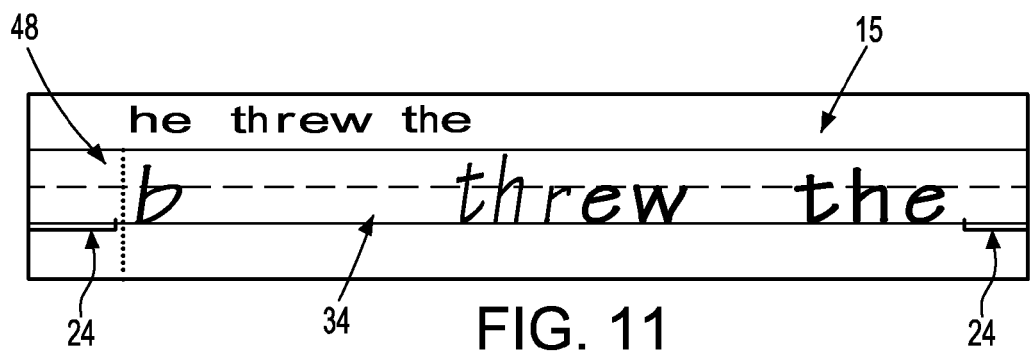
FIG. 11 is a plan view of the user interface shown in FIG. 9 depicting a new active stroke entry in the new word entry field to the right of the new word spacing indicator.

Referring to FIG. 5, for characters with multiple strokes (such as the letter "t"), the user simply writes the second stroke in its natural position with respect to the current character stroke set 22a in the current character field 22. Referring to FIG. 6, when the stroke overlaps the previous stroke, as for the letter "t", it is added to the current character stroke set 22a, which is resubmitted to the recognition engine 72. The recognition results are updated in the ORB 86, and the ORB display 15 reflects the updated recognition result 15b. The new segmentation is also indicated by displaying the two strokes with the same color appearance in the stroke entry and display field 20. As the user writes from left to right in the stroke entry and display field 20, the recognition results for older stroke sets being shifted left to position 58 and position 54 in the ORB display, and the oldest strokes are shown as faded in position 62, shown in FIG. 6. The oldest strokes eventually fade away completely, so that by the time the user reaches the end of the baseline, the left-hand side of the entry field is cleared of old strokes and is available for new strokes. The algorithm for fading the older writing can be based on, for example, a combination of the rightmost "x" position of the last stroke, the width of the entry field, the number of characters written on the baseline, or the number of words written on the baseline. Strokes may also be different colors to assist the writer in distinguishing a new character from a currently recognized character, for example, referring to FIGS. 3 and 4, a new stroke may be black while being drawn, subsequently turn red as part of the current character stroke set 22a, turn from red to dark grey after a new character stroke has been initiated, and then fade 62 as new strokes are entered at locations well distant in time and/or space. At the end of the baseline, the character spacing indicator wraps to the left-hand side to allow either continuation of the current word or creation of a new word. Referring to FIG. 9, to continue the current word the writer may enter strokes above either of the character spacing indicator segments at either end of the baseline.

The ORB 86 is typically cleared when the user generates a new line. The method for generating a new line is not part of the present invention, but is typically through the use of a special stroke gesture or button or by interacting directly with the user application. The ORB 86 memory functions as a FIFO buffer (first-in, first-out buffer). When the ORB display 15 fills, the "oldest" (left-most) characters are typically cleared from the ORB 86 and thus the ORB display 15. Clearing typically takes place at the word-level, that is, when the first character of a word would extend outside the window then the entire word is removed from the ORB 86 and display 15.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A handwriting recognition device, comprising:
a handwriting recognizing component;
a user interface including a display having multiple horizontal lines including a center line and a base line for sizing writing strokes and characters in a vertical direction;
a stroke entry field for entering strokes forming written characters in a current character field of the stroke entry field forming a current character stroke set, the current character stroke set being written by multiple strokes, and the handwriting recognizing component interpreting the multiple strokes as comprising a single character;
a new character entry field next to and in a next character position from a character in the current character field indicating a position in the stroke entry field for entering a next character, the new character entry field being indicated by a bracket;
a new word entry field next to and less than a character width away from the bracket, the stroke entry field for entering strokes for a new word;
a visual spacing indicator as a broken vertical line between the new character entry field and the new word entry field such that entering strokes for the new word automatically inserts a space between the next character and the new word;
a current recognized character display area on the display substantially adjacent to and above the stroke entry field for displaying at least one current recognized character by the handwriting recognizing component, and the current recognized character and locations of the new character and new word entry fields and the visual spacing indicator being changed in response to adding strokes to the current character stroke set, and the handwriting recognizing component includes an output recognition buffer (ORB) for holding the at least one character in the buffer while the at least one character is being displayed in the recognized character display area, and the at least one character being displayed in an ORB recent recognition results display area such that recent;
drop down menus being initiated by a user for displaying alternative characters and alternative words;
wherein older stroke sets are displayed with a specified color and brightness and shift in a left direction wherein the oldest strokes fade away as the user enters strokes on the baseline wherein a left most side of the stroke entry field is cleared of old strokes and is available for new strokes; and
wherein the bracket wraps around the stroke entry field prompting the user to begin a new line at the left most side of the stroke entry field and the bracket simultaneously spans a right most side of the stroke entry field and the left most side of the stroke entry field.

2. A method for recognizing handwriting, comprising:
writing characters using multiple strokes in a stroke entry field on a display of a user interface;
displaying the digitalized strokes in a current character field of the stroke entry field, the stroke entry field having multiple horizontal lines including a center line and a base line for sizing writing strokes and characters in a vertical direction;

displaying the digitalized strokes in an ORB recent recognition results display area;
interpreting the multiple strokes as comprising a single character;
recognizing the written characters;
displaying recognized characters substantially adjacent to the current character field of the stroke entry field;
changing the recognized characters in response to changing the strokes in the stroke entry field;
displaying a new character entry field next to and in a next character position from a character in the current character field indicating a position in the stroke entry field for entering a next character, the new character entry field being indicated by a bracket;
displaying a new word entry field adjacent to the stroke entry field for entering strokes for a new word;
displaying a visual spacing indicator between the new character entry field and the new word entry field;
shifting the visual spacing indicator in relation to the changing of the recognized characters and the entry of the next characters
initiating drop down menus by a user for displaying alternative characters and alternative words;
displaying older stroke sets with a specified color and brightness and shifting in a left direction wherein the oldest stroke fades away as the user enters strokes on the baseline wherein a left most side of the stroke entry field is cleared of old strokes and is available for new strokes; and
wrapping the bracket around the stroke entry field to prompt the user to begin a new line at the left most side of the stroke entry field and the bracket simultaneously spans a right most side of the stroke entry field and the left most side of the stroke entry field.

* * * * *